United States Patent [19]

Hishikawa

[11] Patent Number: 5,081,755
[45] Date of Patent: Jan. 21, 1992

[54] METHOD AND AN APPARATUS FOR INSERTING A SPOKE INTO A SPOKE HOLE OF A FLANGE OF A HUB

[75] Inventor: Toshiharu Hishikawa, Nara, Japan

[73] Assignee: Araya Industrial Co., Ltd., Osaka, Japan

[21] Appl. No.: 600,845

[22] Filed: Oct. 22, 1990

[30] Foreign Application Priority Data

Oct. 20, 1989 [JP] Japan .................................. 1-274452

[51] Int. Cl.⁵ .............................................. B21K 1/34
[52] U.S. Cl. ................................. 29/894.33; 157/1.5
[58] Field of Search ...................... 29/894.33, 894.331, 29/894.332, 894.333, 894.343; 157/1.5, 1.55

[56] References Cited

U.S. PATENT DOCUMENTS

| | | | |
|---|---|---|---|
| 3,840,965 | 10/1974 | Meiklejohn | 157/1.55 |
| 4,505,315 | 3/1985 | Kaufeldt | 157/1.5 |
| 4,538,332 | 9/1985 | Carminati | 29/894.33 |
| 4,574,446 | 3/1986 | Kaufeldt et al. | 29/894.333 |

FOREIGN PATENT DOCUMENTS

WO83/00032 1/1983 PCT Int'l Appl. .

Primary Examiner—P. W. Echols
Attorney, Agent, or Firm—Stevens, Davis, Miller & Mosher

[57] ABSTRACT

The present invention is a process for manufacturing a bicycle and an apparatus for inserting a spoke into a spoke hole of a flange of a hub from a spoke ejection apparatus that is arranged to face the spoke hole and eject the spoke by air under pressure.

8 Claims, 14 Drawing Sheets

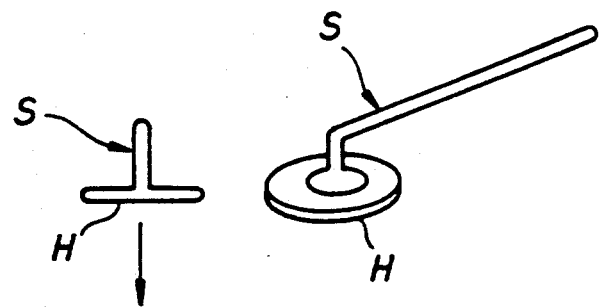
FIG. 4a
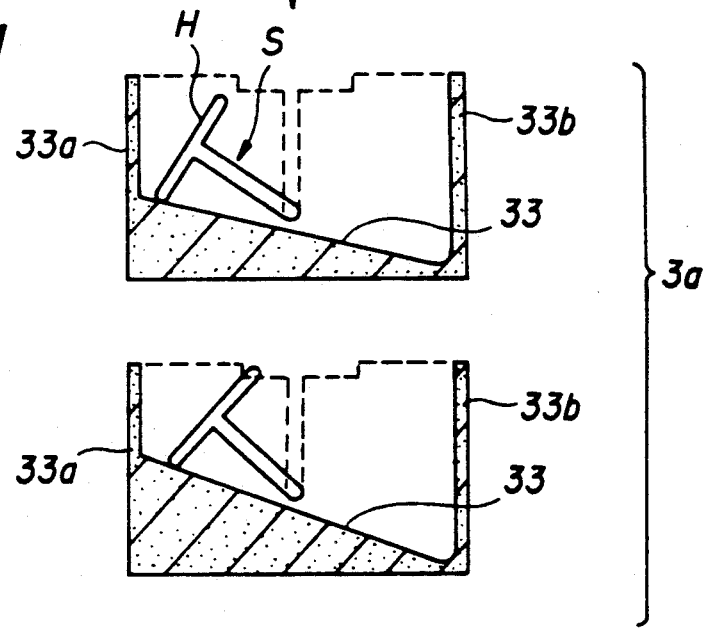
FIG. 4b
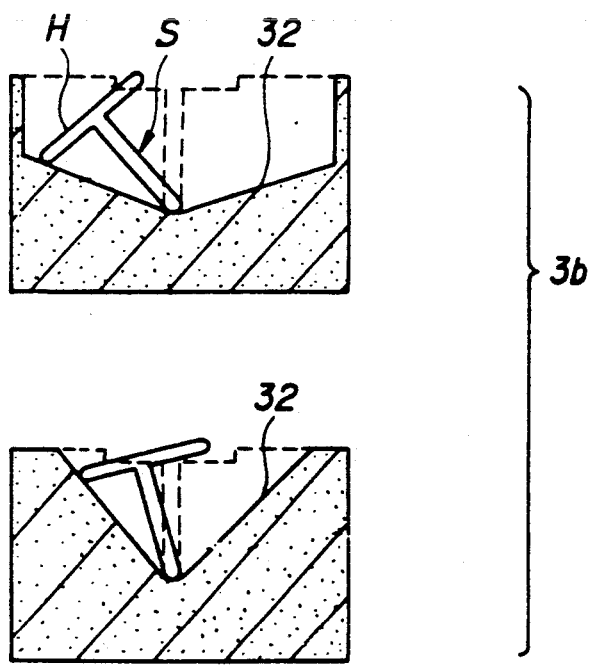

METHOD AND AN APPARATUS FOR INSERTING A SPOKE INTO A SPOKE HOLE OF A FLANGE OF A HUB

FIELD OF INVENTION

The present invention relates to a method and apparatus for inserting spokes into spoke holes of hub flanges.

BACKGROUND OF THE INVENTION

Examples for inserting spokes into spoke holes of hub flanges of a method and an apparatus are disclosed in U.S. Pat. No. 4,538,332.

The above prior art is related to apparatus for inserting spokes into spoke holes provided in a flange of a hub, particularly for bicycles.

In known prior art, the hub 1 is supported in a horizontal position as shown in FIG. 14.

The spoke is inserted into the spoke holes 11, 12 of each flange 10a, 10b from the spoke inserting device 2 arranged respectively at both sides of the hub.

The spoke inserting device 2 is mentioned in PCT Laid Open Gazette No. WO/83/00032 (Japanese Patent Application Laid Open Gazette No. Sho-58-50091).

In accordance with the prior art (FIG. 15), a nozzle N and holder C are constructed in one body and an upwardly opened groove 3 is provided in said holder C.

The groove 3 has means to thread spokes and the holder C reciprocates on the base B as shown in FIG. 15.

In this prior art, the spoke received in the groove 3 is removed from the base side of the groove 3 toward the nozzle N along the groove 3.

Then, the holder C having the groove 3 is advanced from the base B for an appointed stroke and stays there. Like this, the spoke S in the groove 3 automatically threads into the spoke hole at the time that the nozzle N is approaching the spoke hole.

Subsequently, said operation for setting position of the hub and the guide device is repeated.

The prior art, however, has the following problem.

The spoke driving forward means for threading the spoke received in the groove 3 into the spoke hole from the nozzle N is constructed by a shifting body 20 in the groove 3 and a driving mechanism for reciprocating the shifting body 20. Said driving mechanism is formed by a belt 21 wound between a pair of pulleys.

However, it is difficult to shift the body 20 quickly, because shifting speed of the belt is pretty slow.

Accordingly, the object of the present invention is to provide a novel method and an apparatus for inserting the spoke into the spoke hole in the flange of the hub more speedily than said prior art and automatically.

SUMMARY OF THE INVENTION

In accordance with the present invention, a novel method and an apparatus for inserting a spoke at its pointed end into a spoke hole is provided for the purpose of avoiding all the problems of the prior art.

The invention is a method for ejecting the spoke from the spoke ejection device into the spoke hole of the hub flange and inserting the spoke at its pointed end into the spoke hole. The spoke is composed of a base or head and an elongated section having a pointed end. In the method for ejecting the spoke from the spoke ejection device the device faces the spoke hole of the hub flange.

The method comprises disposing a spoke holding chamber at the injection end of the nozzle facing the spoke hole of the hub flange, holding the spoke at a position suitable for being shot out from the spoke holding chamber substantially sealed up, and blowing air under pressure into the spoke holding chamber from the injection end of the spoke holding chamber whereupon the spoke is shot out of the nozzle with its pointed end into the spoke hole of the hub flange.

Then, if the pointed end of the spoke does not position in the spoke hole, the spoke is easily and precisely inserted into the spoke hole, because micro vibrations perpendicular to the ejection direction of the spoke occur in the spoke when the spoke is ejected by air under pressure. After the spoke is inserted the process is repeated.

The invention has the following advantages:

a) the spoke ejection operation is able to be made more quickly than in the prior art, because air under pressure shooting out the spoke thrusts the spoke rapidly.

b) the position of the pointed end of the spoke is precisely inserted into the spoke hole, because micro vibrations occur in the spoke.

The apparatus comprises a nozzle facing the spoke hole for ejecting the spoke, a holder providing a groove for receiving the spoke, a groove cover for opening and shutting the groove, a groove cover driving device for opening the groove cover when the spoke is received and closing the groove cover when the spoke is to be ejected, an air outlet for blowing air under pressure into said groove, and an air pressure control means for blowing air under pressure from said air outlet into said groove when the groove cover is shut.

The apparatus operates as follows.

When the spoke is received in the groove, the groove cover shuts the opening part of the groove, air under pressure is blown into the groove by output of the air control means, the spoke is ejected from the nozzle and the groove cover is opened to receive a following spoke. After that, the operation is repeated.

An advantage is that as soon as the spoke is ejected from the groove, the air under pressure is stopped and the groove cover is opened to receive in the groove a following spoke. The time of operation for ejecting the spoke is much shorter than that of the prior art.

Another embodiment of the invention comprises a nozzle facing the spoke hole of the hub flange, an intermittently revolving cylindrical body arranged at the injection of the spoke side of the nozzle and having spoke holding holes therethrough at regular intervals along a concentric circle with the revolving cylindrical body's axis as a center, a spoke receiving groove for receiving a spoke dropped from the spoke supplying device and shifting the spoke into the spoke holding hole rotated to the highest position of the revolving cylindrical body, and an air outlet formed in a cylindrical body arranged at the inlet side of the revolving body for supplying air under pressure for blowing air under pressure into the spoke holding hole rotated to the lowest position of the revolving cylindrical body.

The operation of the apparatus is as follows. The spoke holes are holed through the intermittently revolving body along its circumferential surface.

The spoke is ejected by air under pressure blown out of the air outlet, when the spoke holding hole rotated to the lowest part of the revolving cylindrical body itself becomes co-axial with the nozzle and the air outlet.

At that time, the spoke hole rotated to the highest part of the revolving cylindrical body becomes co-axial with the receiving groove and then a spoke received in the groove is shifted to the spoke hole positioned at the highest part of the revolving cylindrical body.

When the spoke is ejected from the nozzle and the other spoke shifted to the holding hole of the revolving cylindrical body the air control means is stopped.

After that, the operation is repeated.

An advantage is that at the same time as one spoke is ejected from the nozzle positioned at the lowest part of the revolving cylindrical body, the other spoke is shifted to the holding hole positioned at the highest part of the revolving cylindrical body from the groove, so the spoke ejection operation is continuous.

A further embodiment comprises a nozzle facing one of the spoke holes for ejecting the spoke into the spoke hole of the hub flange, an intermittently revolving cylindrical body in contact with the injection end of the nozzle having grooves formed at regular intervals on the surface of the revolving cylindrical body, the grooves opening at both ends for receiving the spoke and holding it in a predetermined position for being ejected into the spoke hole, a cylindrical cover body having an opening part in its top part for sealing the groove of the revolving cylindrical body, said open part of the cylindrical cover just meeting a position of the groove rotated at the highest position of the revolving cylindrical body and the spoke feeding part of the spoke supplying device, and an air outlet formed in a body for supplying air under pressure arranged at the inlet side of the revolving cylindrical body for blowing air into the groove rotated to the lowest position of the revolving cylindrical body.

The operation of the apparatus is as follows.

First of all, the spoke dropped from a chute of the spoke supplying device positioned just overhead to the revolving cylindrical body is received in the groove positioned at the highest part of the revolving cylindrical body and is held in a position suitable for being ejected from the nozzle.

When the groove is rotated to the lowest part of the revolving cylindrical body, the groove becomes co-axial with the air outlet and the nozzle, and then the spoke is ejected.

When the spoke is ejected, the other spoke is received in the groove positioned at the highest part of the revolving cylindrical body.

This apparatus has the advantage of being small in comparison since the spoke supplying device is arranged just overhead to the revolving cylindrical body.

BRIEF DESCRIPTION OF THE DRAWINGS

FIGS. 4a and 4b show functionally the spoke being dropped from a position that its head part is upside down from its placement in the groove.

DESCRIPTION OF THE PREFERRED EMBODIMENT

Figure 8:
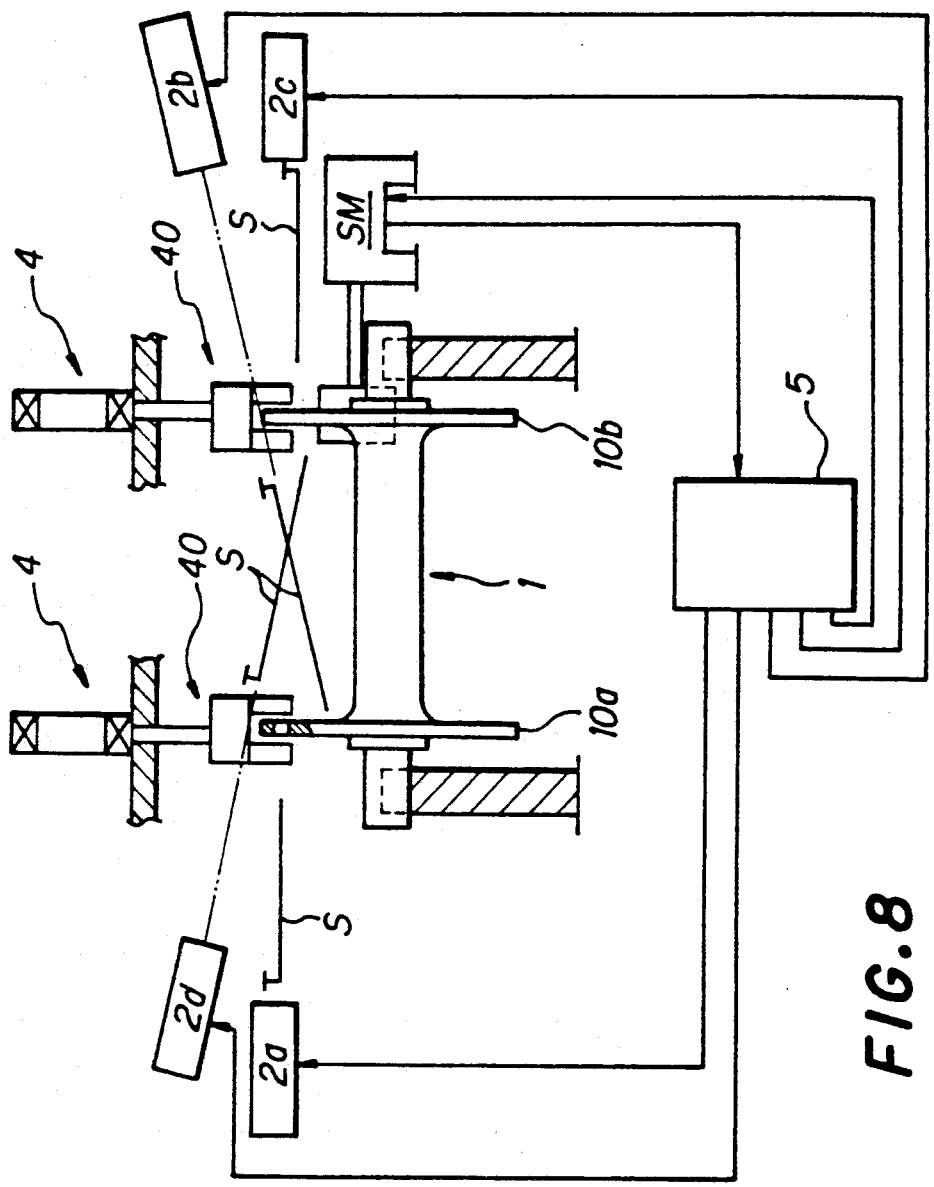
FIG. 8 shows a front elevational view of the spoke ejection apparatus.
Figure 14:
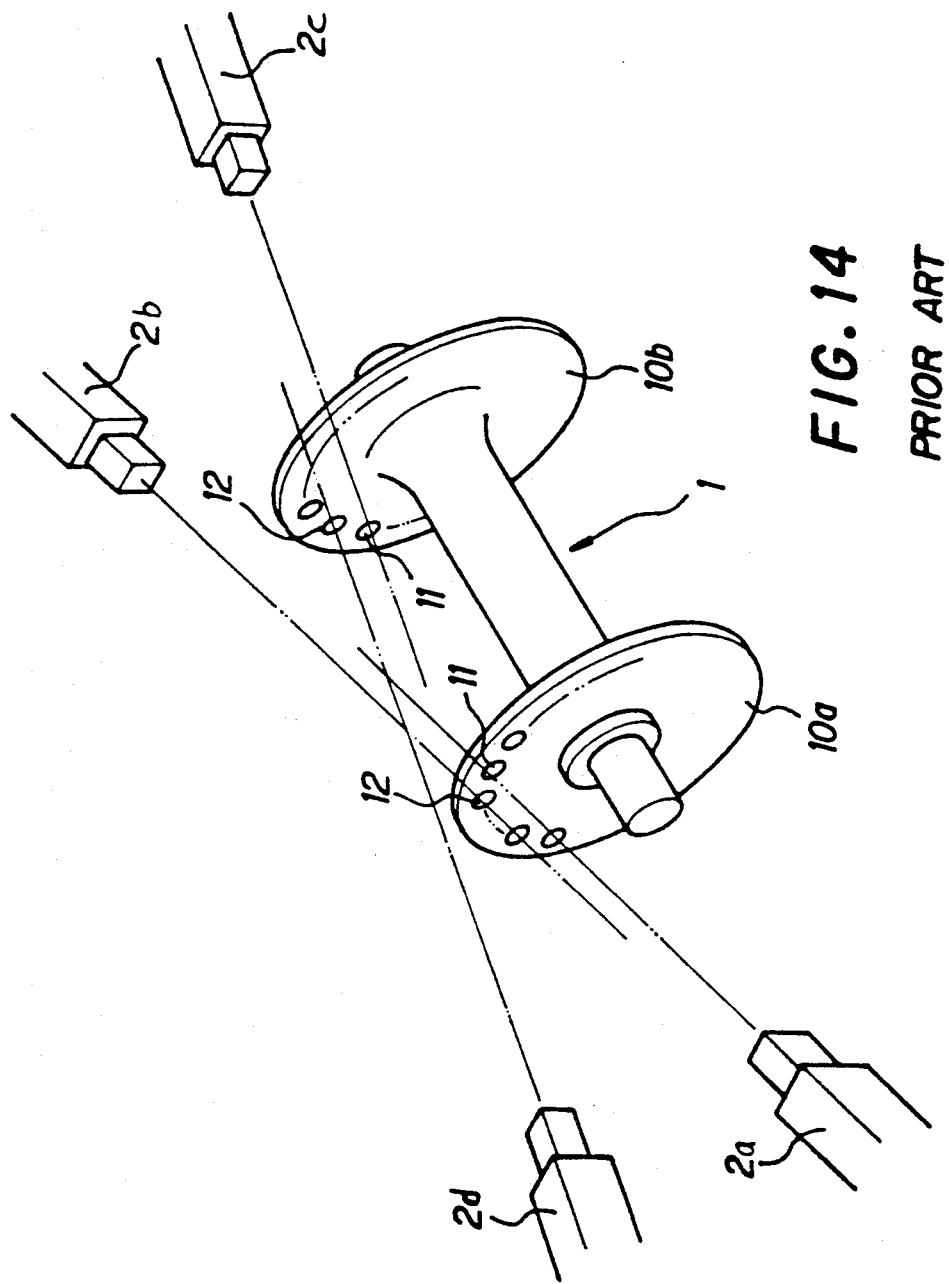
FIG. 14 shows a sketch of a prior threading apparatus.
Figure 15:
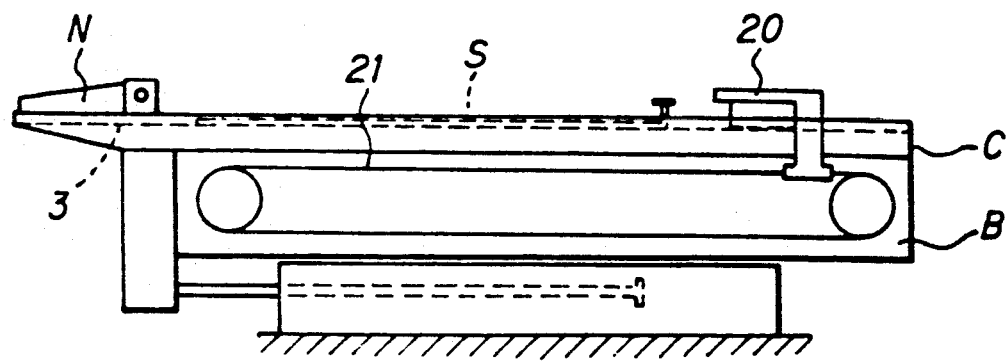
FIG. 15 shows a longitudinal skeleton of a known spoke threading apparatus.

With reference to FIGS. 8 and 14, four spoke ejection devices 2a, 2b, 2c, 2d are arranged to face each spoke hole from outside of the hub 1 as in the prior art.

Namely, a hub is disposed horizontally and a first spoke s is inserted into a spoke hole 11 of the hub flange 10a from the first spoke ejection device 2a arranged at the left side of the hub 1 and a second spoke s is inserted into a spoke hole 12 of the hub flange 10a from the second spoke ejection device 2b positioned at the right side of the hub 1.

On the other hand, a third spoke s is inserted into the spoke hole 11 of the hub flange 10b from the third spoke ejection device 2c arranged at the right side of the hub 1 and the fourth spoke is inserted into the spoke hole 12 of the hub flange 10b from the fourth spoke ejection device 2d at left side of the hub 1.

The spoke ejection direction is planned not to cross each other and said spoke ejection devices 2a, 2b, 2c, 2d are arranged so that the spoke ejection path from each spoke ejecting device does not contact the flanges 10a, 10b.

As a result, each spoke is respectively inserted into each spoke hole 11, 12 in suitable condition.

As shown in FIG. 8, it is necessary that the spoke ejection direction from the spoke ejection device just meets the position of the spoke holes 11, 12.

In this embodiment, when the hub 1 is revolved by a friction driven roller operated by a stepping motor SM and the position of the spoke holes 11, 12 just aligns with the spoke ejection direction, the stepping motor SM is stopped by an output signal of the spoke hole position detecting means 40.

Then, said spoke hole position detecting means 40 is removed to a predetermined position from the detecting position by a hub position deciding means 4.

Figure 1:
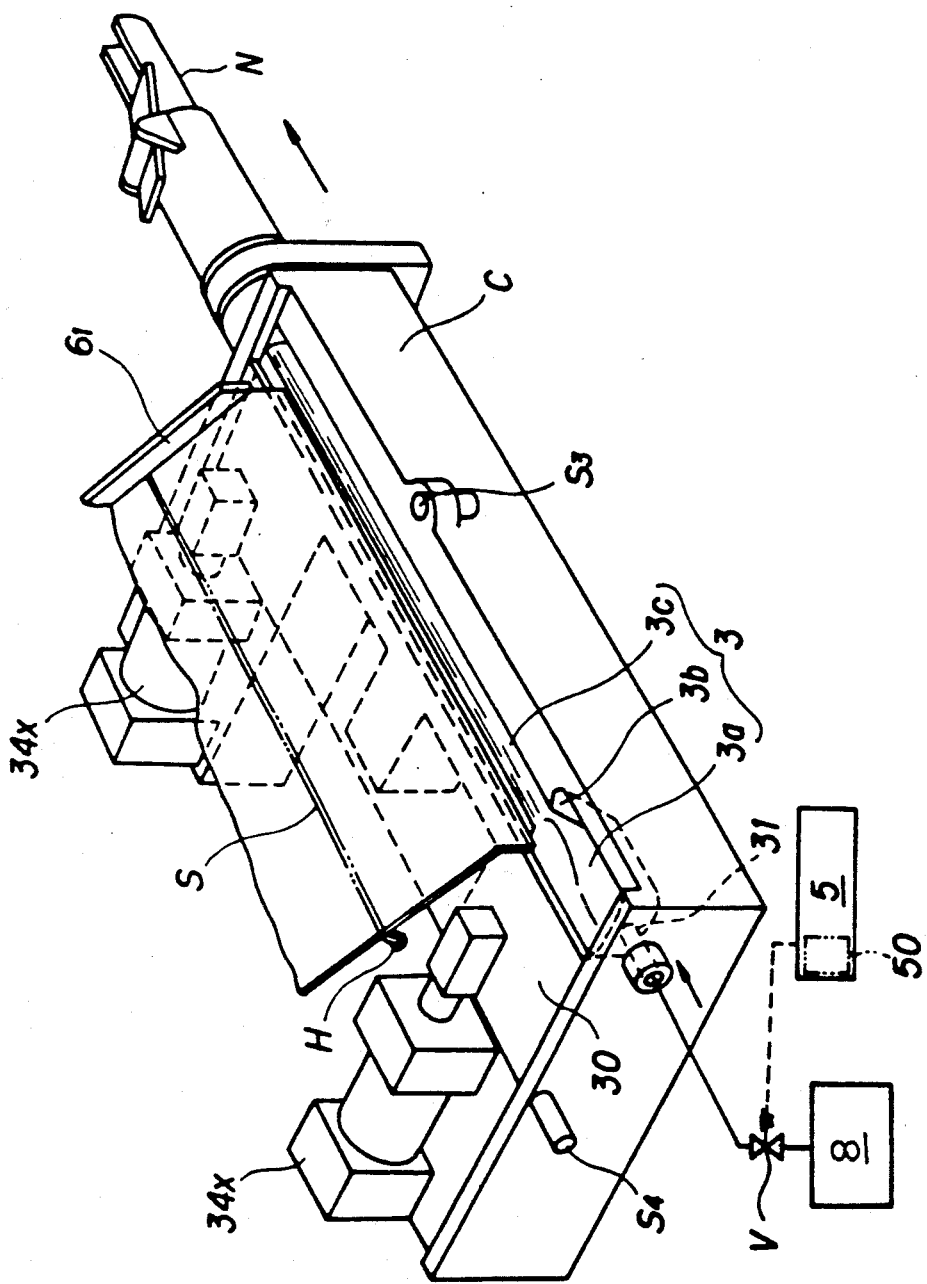
FIG. 1 shows a spoke ejection apparatus drawn to the invention.

Referring to FIG. 1, an opening part is longitudinally extended in a spoke receiving and holding groove 3.

The opening part is shut and opened by a groove cover 30.

Figure 2:
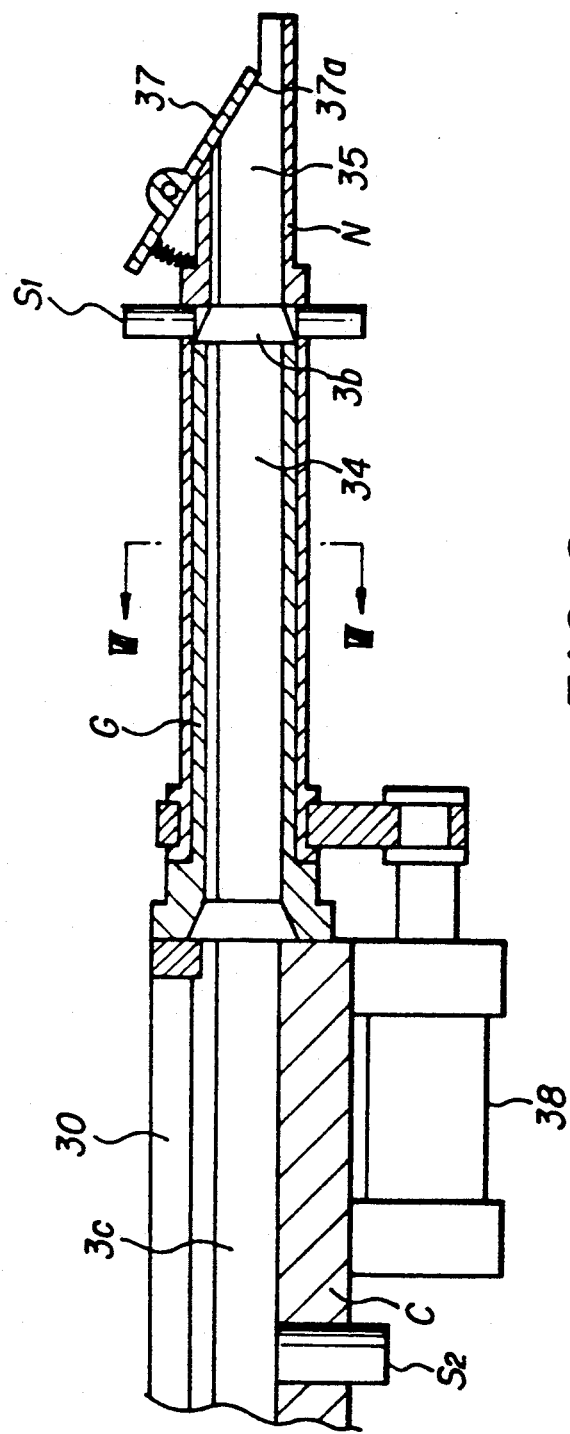
FIG. 2 shows a vertical and longitudinal section of a portion of the apparatus containing a nozzle.

The groove 3 is provided in a holder C fixed to the spoke ejection device of FIG. 2.

At the spoke pointed end side of the holder C, a nozzle N is reciprocated along the connecting cylindrical body G by a air cylinder 38.

The groove 3 is positioned to meet the position of the lowest part of the chute 61 of the spoke supplying device.

The length of the opening part of the groove 3 is longer than one of the spokes s.

The groove cover 30 is provided in the holder C and it is not necessary that the groove cover 30 perfectly covers the opening of the groove 3, but the thrust force for ejecting spokes s increases in accordance with an increased effective sealing.

The chute 61 is for dropping spokes s by gravity onto an inclined plate with the side width of the chute 61 being a little shorter than the length of a spoke s.

Figure 4:
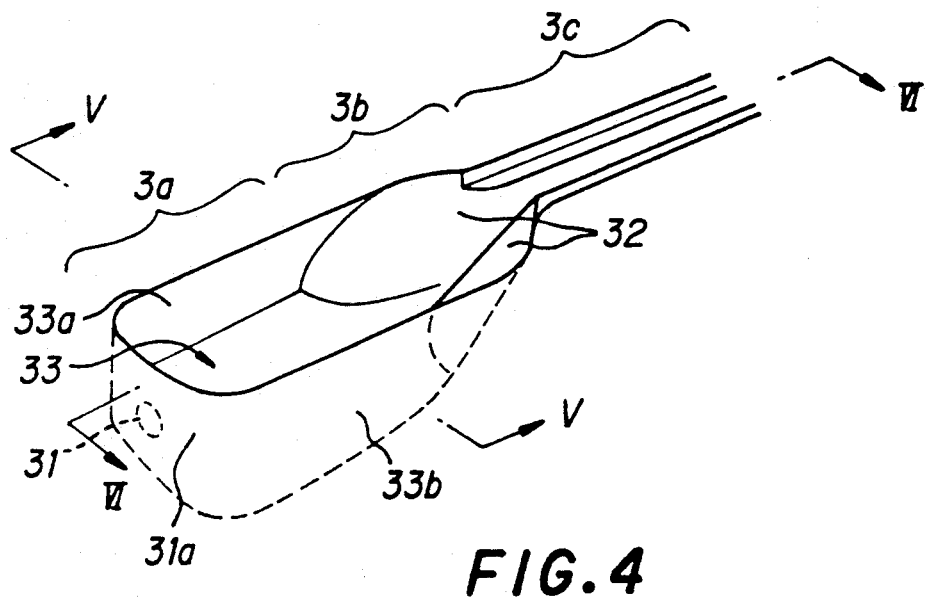
FIG. 4 shows a portion of a groove of the spoke ejection portion of the device.

The groove 3 has first, second and third groove parts 3a, 3b, 3c (FIG. 4).

Figure 5:
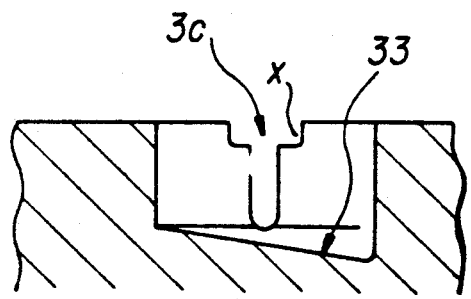
FIG. 5 shows a sectional view taken along line V—V of FIG. 4.
Figure 6:
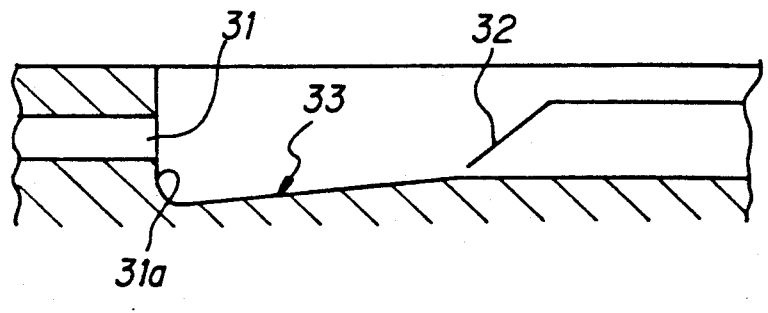
FIG. 6 shows a sectional view taken along line VI—VI of FIG. 4.

The third groove part 3c is T shaped as shown in FIG. 5. The spoke is guided with its head part H directed upwardly. Then, the head part H of the spoke s is received in a head part course x.

The second groove part 3b, as shown in FIG. 4, has both side walls 32, 32 forming downwardly converging surfaces toward part 3a and the side wall 32 becomes almost horizontal at part 3a as shown in FIGS. 4, 4a and 4b.

The side 32 wall becomes a vertically standing wall at its part 3c end.

By the above construction, the side walls are smoothly curved from a horizontal surface to a vertical surface.

The first groove part 3a is positioned at the spoke head end of the second groove part 3b with the width of the first groove part 3a being larger than twice the length of the head part H of the spoke s. The first groove part 3a is shaped as a rectangular indentation.

The bottom plane 33 of the first groove part 3a smoothly slopes down from the spoke pointed end to the spoke head end plane 31a and from one side wall 33a to the other wall 33b as shown in FIG. 5.

The air inlet 31 is open in the spoke head end plane 31a which stands vertically at the spoke head end of the bottom plane 33.

The groove cover 30 formed as a rectangular plate reciprocates perpendicularly to the spoke shifting course.

The groove cover 30 is driven by a pair of air cylinders 34x.

Figure 7:
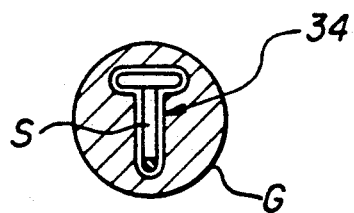
FIG. 7 shows a sectional view taken along line VII-—VII of FIG. 2.

A connecting cylindrical body G is mounted to the spoke pointed end side of the holder C and is shaped as a cylinder forming a spoke passing groove 34 having a section as shown in FIG. 7.

The spoke head end side of the nozzle N extends out of the connecting cylindrical body G having a section shaped the same as the spoke passing groove 34. The nozzle N is able to reciprocate along the outside of the connecting cylindrical body G.

A spoke passing groove 35 having a section the same as the spoke passing groove 34 of the connecting cylindrical body G is formed in the nozzle N.

The upper part of the point end of the spoke passing groove 35 is cut off by an inclined surface 37a formed at the spoke pointed end part of the nozzle N as shown in FIG. 2.

A covering plate 37 is mounted and pressed on said inclined surface 37a. The spoke passing groove 35 is opened under the covering plate 37.

The air cylinder 38 for reciprocating the nozzle N is mounted to the holder C.

The nozzle N is advanced from an appointed retreated position to an appointed advanced position and stays at the advanced position when a hub 1 is set.

Then, the distance between the point end of the nozzle N and each flanges 10a, 10b is smaller than the length of the spoke s.

The nozzle N retreats to the retreat position after the spoke s is inserted into the spoke hole.

After that, the operation is repeated.

In FIG. 1, the air valve v inserted in a circuit containing the air cylinder 38 and air outlet 31 is controlled by a control means 5 belonging to the air control device 50.

A spoke passing sensor $S_1$ for detecting the fact that the spoke s passes through a position of said sensor $S_1$ itself is arranged at the base end of the passing groove 35 of the nozzle N, and a spoke receiving sensor $S_2$ for detecting a fact the spoke is received is arranged in the bottom of the groove 3.

A groove cover shutting sensor $S_3$ for detecting the fact that the groove cover 30 is shut and a groove cover opening sensor $S_4$ for detecting a fact the groove cover 30 is opened, are arranged on the spoke ejector.

The spoke passing sensor $S_1$ is for putting out signals to inform that the spoke s is passed through sensor $S_1$ itself within an appointed time.

If the signal to inform that the spoke is passed through the sensor $S_1$ is not put out, it is noticed that the spoke s is stopped and then the spoke ejection operation may be stopped.

Figure 9:
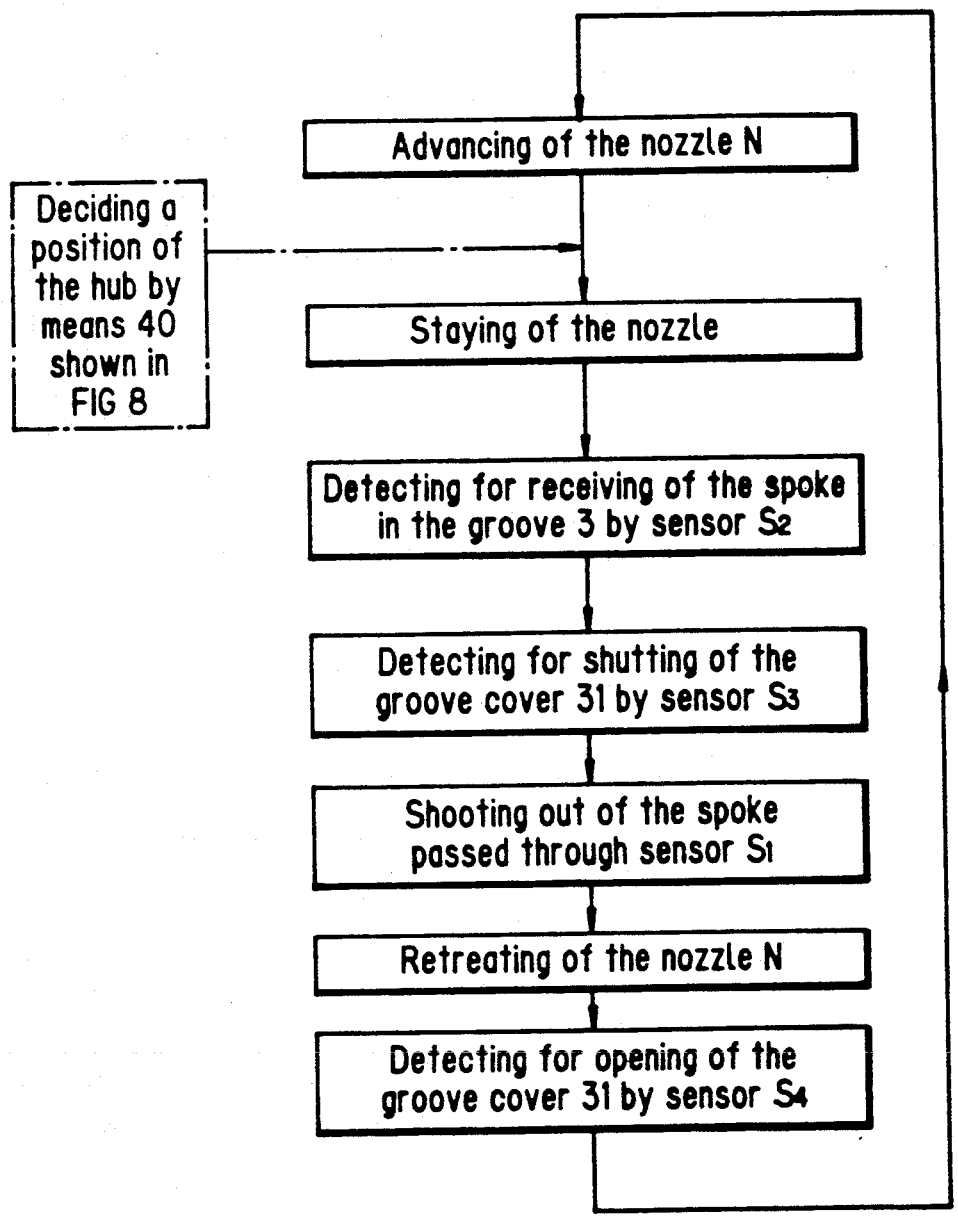
FIG. 9 shows a flow chart of a computer circuit for controlling the spoke ejection apparatus.

The air cylinders 34x, 38 are controlled by the micro computer 5. The control program by the micro computer 5 is shown in FIG. 9 and the following operations are repeated.

First of all, the nozzle N is advanced to the advanced position by driving the air cylinder 38 and, at the same time, the hub 1 is fixed at a predetermined position.

Then, the groove cover 30 is opened since the spoke s has not been received in the groove 3 as yet. After that, the groove cover 30 shuts the groove 3, when the spoke s is received in the groove 3 from the chute 61 of the spoke supplying device 6.

The air cylinder 34x is driven by an output signal of the spoke receiving sensor $S_2$.

When the groove cover shuts the groove 3, the air cylinder 34x is stopped by an output signal of the groove cover shutting sensor $S_3$.

After that, air from air source 8 is blown out from the air outlet 31 by operation of the valve v opened as a result of the detection of the groove cover shutting sensor $S_3$.

The spoke s is shifted to the spoke pointed end side of the nozzle N and then ejected into the spoke hole of the hub flanges 10a, 10b.

When the spoke s passes through the position of the spoke passing sensor $S_1$, the groove cover 30 returns to the open position from the shut position by the air cylinder 34x being reverse-driven as a result of the output of groove cover opening sensor $S_4$ and, at the same time, the valve v is closed.

After the above process, the following spoke inserting process is repeated.

In FIG. 9, a dotted line shows the hub position detecting means. The hub position deciding means 4 in FIG. 8 is for detecting the aligned positions of the nozzle N and the spoke hole and, when means 40 detects that fact above-mentioned, the following spoke inserting operation is started.

Like the above, the process from the hub position deciding operation to the spoke inserting operation is repeated.

In the present embodiment, the inclined bottom plane 33 of the first groove part 3a slopes down from one side wall 33a to the other side wall 33b and slopes down from the spoke pointed end side to the spoke head end plane 31a as above-mentioned. Consequently, if the spoke s drops on the bottom plane 33 in an upside-down position as shown in FIG. 4a that the head part H is directed downwardly, the head part H lays on the inclined bottom plane 33. The head part H gradually stands up along the surface of the bottom plane 33 as shown in FIG. 4b. At the second groove part 3b, the head part H is guided by the side wall 32, 32 and continues to stand up as shown in FIG. 4b.

At third groove part 3c, the head part H is put into the head part course x as shown in FIG. 5.

Like the above, the position of the spoke s is smoothly changed to the normal position such that the head part H is directed upwardly, whereupon the spoke S is ejected by air under pressure.

The outlet of the nozzle N is narrowed by the covering plate 37 pressed on the inclined plane 37a, so that air under pressure for ejection of the spoke s is sufficiently stored.

Figure 3:
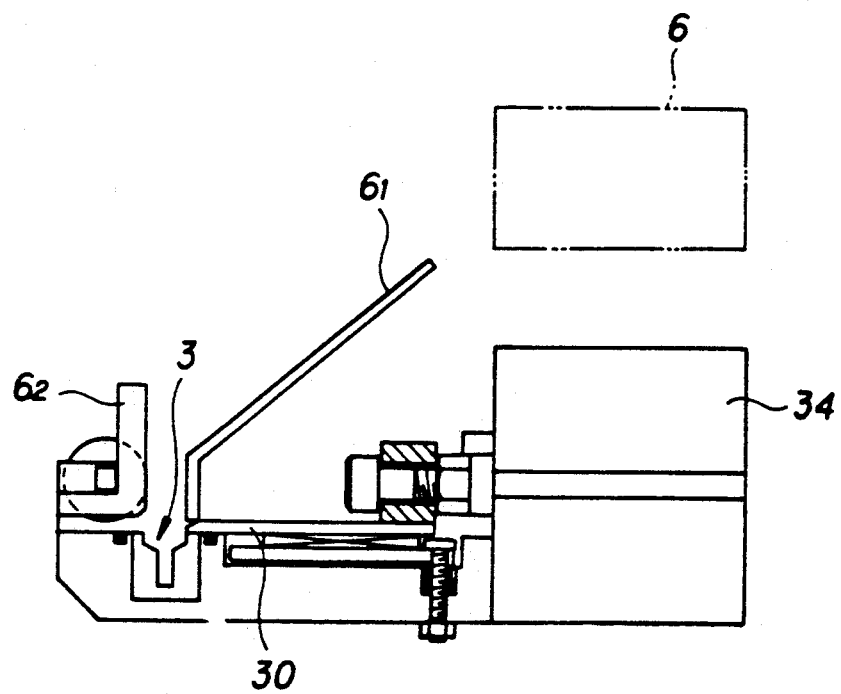
FIG. 3 shows a side elevational view of a spoke supplying portion of the device.

A guide plate 62 in FIG. 3 is disposed with a face to the bottom end of the chute 61 and so that upon the spoke s being dropped on the chute 61 the spoke is assuredly put in the groove 3.

Figure 10:
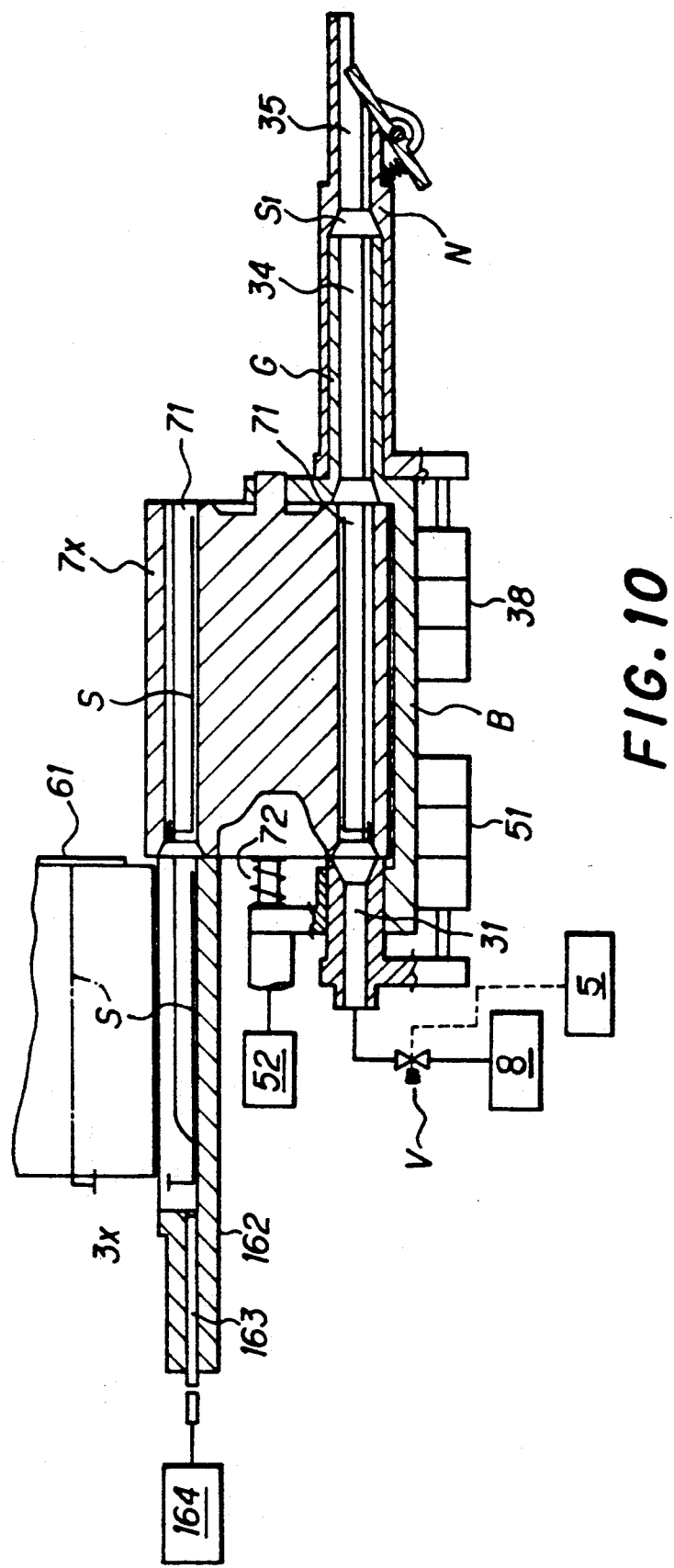
FIG. 10 shows a vertical and longitudinal section of a second embodiment of the ejection apparatus of the present invention.
Figure 11:
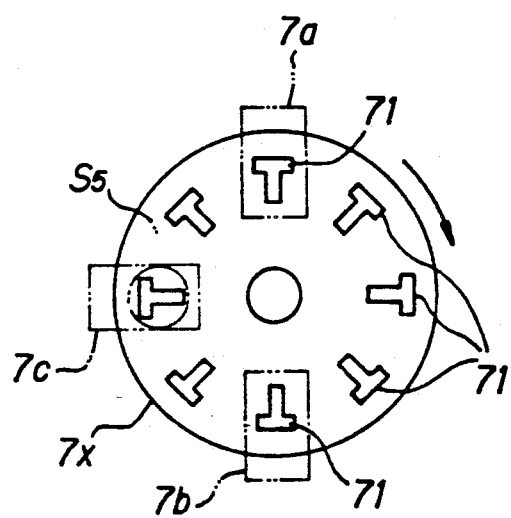
FIG. 11 shows a perpendicular sectional view of the revolving cylindrical body of FIG. 10.

FIGS. 10 and 11 show a second embodiment of the present invention.

The apparatus of the second embodiment has an intermittently revolving cylindrical body 7x supported on a base B.

The axis of the revolving cylindrical body 7x is parallel to the spoke ejection direction.

The spoke holding holes 71 pass through the revolving cylindrical body 7x and are distributed at regular intervals parallel to the revolving cylindrical body's axis along a concentric circle with the revolving cylindrical body's axis as a center.

The cross-section of the spoke holding hole 71 is same as the spoke passing hole of the first embodiment as shown in FIG. 7.

The spoke holding hole 71 holding the spoke is rotated to a position of the lowest part of the revolving cylindrical body 7x to face the air outlet 31 of the body T for supplying air under pressure.

On the other hand, the air outlet 31, the revolving cylindrical body 7x and connecting cylindrical body G from which the nozzle N extends are disposed on the base B from the spoke head base end side to the spoke pointed end side.

When the spoke s is ejected from the nozzle N, the air outlet 31, the spoke holding hole 71 positioned at the lowest part of the revolving cylindrical body 7x and the spoke passing hole 35 of the connecting body are co-axial.

The revolving cylindrical body 7x is pressed to the injection end of the connecting cylindrical body G fixed to the base B by a spring 72 disposed at the injection side of the revolving cylindrical body 7x.

The body T for supplying air under pressure forming the air outlet 31 is reciprocated by an air cylinder 51 fixed to the base B.

The revolving cylindrical body 7x is intermittently revolved by a stepping motor 52 and the revolving body position sensor S5 (FIG. 11) faces the spoke holding hole 71 not having the spoke s for deciding the position of the revolving cylindrical body 7x. Then the revolving cylindrical body 7x is stayed.

Thus, when the position of the spoke holding hole 71 and the sensor S5 are aligned, driving of the stepping motor 52 is stopped for an appointed time.

As shown in FIG. 11, the revolving cylindrical body 7x consists of a spoke receiving section 7a in the part containing the highest spoke holding hole 71, a spoke shooting section 7b positioned in the part contained the lowest spoke holding hole 71 and a revolving cylindrical body position detect section 7c positioned in the part between the spoke receiving section 7a and the spoke shooting section 7b.

At the spoke receiving section 7a, the spoke s is dropped from the chute 61 of the spoke supplying device 6 into the groove 3x which is the same as the shape of the first embodiment.

The fixed arm 162 positioned adjacent the revolving cylindrical body 7x defines a groove 3x. An air cylinder 164 combined with a piston 163 is arranged at the free end of the fixed arm 162. The spoke s received in the groove 3x is shifted to the spoke holding hole 71 of the revolving cylindrical body 7x by reciprocation of the piston 163.

Valve v for operating the air outlet 31, the air cylinders 38, 51, 164 and the stepping motor 52 are operated based on a predetermined timing program by outputs of the spoke passing detect sensor $S_1$ and revolving cylindrical body position detect sensor $S_5$.

The apparatus of the second embodiment is operated as follows.

Before ejection of the spoke, nozzle N is advanced to the appointed advanced position from the retreat position and stays there.

Then, each spoke holding hole 71 is positioned as shown in FIG. 11. The spoke holding hole 71 positioned at the lowest part of the revolving cylindrical body 7x, air outlet 31, the spoke passing hole 35 of the nozzle N, and the spoke passing hole 34 of the connecting cylindrical body G are aligned co-axially.

At that time, the body T is brought into contact with the revolving cylindrical body 7x by the air cylinder 51 reversely driven.

After that, air under pressure from air source 8 is blown into the spoke holding hole 71 from the air outlet 31 by opening of the valve v and the spoke s received in the spoke holding hole 71 is ejected from the nozzle N into the spoke hole of the hub flange.

After ejection of the spoke s, the contact between the body T and revolving cylindrical body 7x is released by the air cylinder driven based on the output of the spoke passing detection sensor $S_1$, and a at the same time, the revolving cylindrical body 7x is revolved for one step by driving of the stepping motor 52.

When a position of the revolving body position sensor $S_5$ takes a position of the following spoke holding hole 71 as a result of the revolving of the revolving cylindrical body 7x, the stepping motor 52 is stopped by an output signal of the revolving body position sensor $S_5$.

Then, as the spoke holding hole 71 positioned at the highest part of the revolving cylindrical body 7x does not have the spoke s, the spoke received in the groove 3x is shifted into the spoke holding hole 71 by the driving of the piston 163 with the air cylinder 164.

At the same time the spoke holding hole 71 positioned at the lowest part of the revolving cylindrical body 7x becomes co-axial with the air outlet 31, the spoke is ejected.

The above operations of the second embodiment are made by the micro computer 5 like the first embodiment.

The apparatus of the second embodiment has an advantage in that ejection of the spoke s is continuously made, because the revolving cylindrical body 7x is intermittently revolved by the stepping motor 52 and the spoke s is ejected at every one step of the stepping motor 52.

At the same time that the spoke is ejected, the spoke in the groove 3x is shifted into the spoke holding hole 71.

Figure 12:
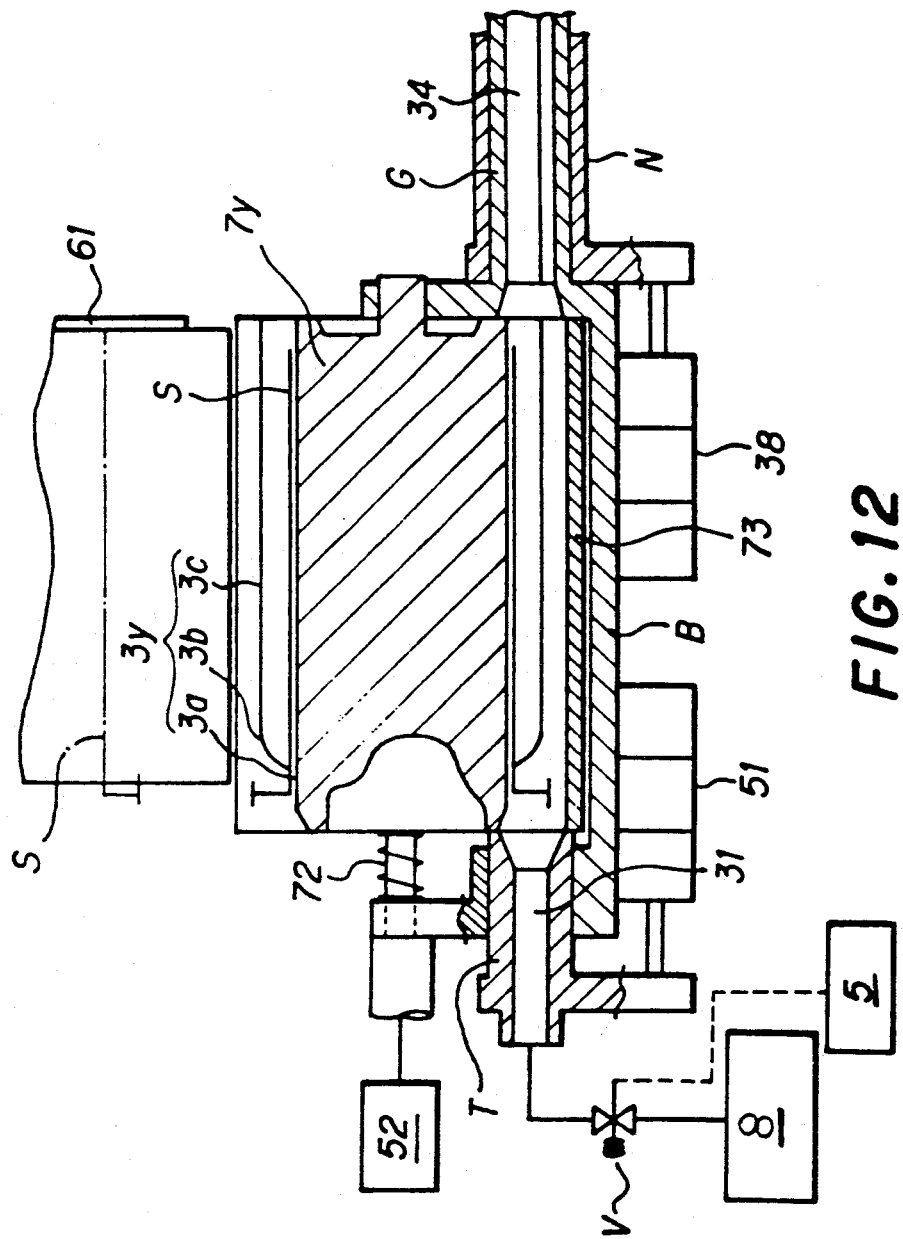
FIG. 12 shows a vertical and longitudinal section of a third embodiment of the ejection apparatus of the present invention.
Figure 13:
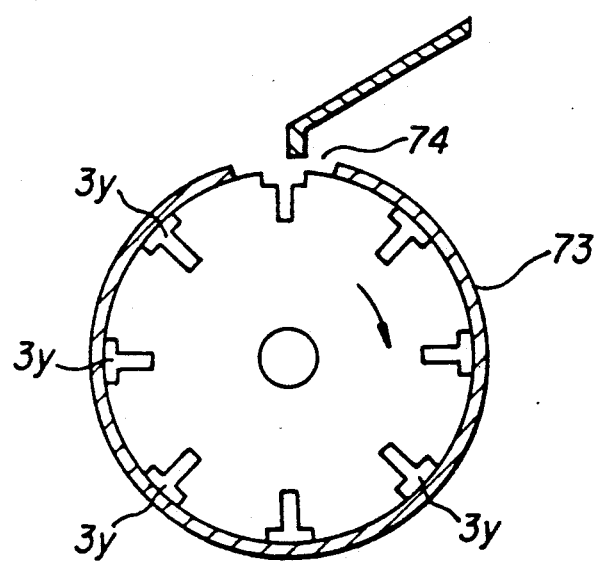
FIG. 13 shows a lateral sectional view of the revolving cylindrical body of FIG. 12.

FIGS. 12 and 13 show the third embodiment of the present invention.

In the third embodiment, spoke receiving and holding grooves 3y are formed by a recessing surface of an intermittently revolving cylindrical body 7y at regular intervals.

The circumference of the revolving cylindrical body y is covered by a cylindrical cover 73 having an opening part 74 and the revolving cylindrical body 7y can revolve inside of the cylindrical cover 73.

The opening part 74 of the cylindrical cover 73 positioned at the top part of the revolving cylindrical body 7y faces the lowest part of the chute 61 of the spoke supplying device 6.

The spoke supplying device 6 is constructed in the same way as the first embodiment.

When the revolving cylindrical body 7y intermittently revolves and stops, the groove 3y positioned at the lowest part of the revolving cylindrical body 7y becomes co-axial with the air outlet 31 and the groove positioned at the highest part of the revolving cylindrical body 7y is aligned with a position of the opening part 74 of the cylindrical cover 73.

Consequently, the groove 3 positioned at the highest part of the revolving cylindrical body 7y faces the chute 61.

The third embodiment, with the spoke ejection and spoke receiving operations, is made in the same way as the second embodiment.

The groove 3y has the first, second and third groove parts 3a, 3b, 3c which are the same as the first embodiment as shown in FIGS. 4, 4a, 4b. The third embodiment, however, is different from the ﬁrst embodiment in that both ends of the groove 3y are open.

The apparatus of the third embodiment does not require the space for the spoke supplying device, because the spoke supplying device is positioned just overhead the revolving cylindrical body 7y.

The spoke ejection and spoke receiving operations are made in the same way as the second embodiment.

I claim:

1. A method for inserting a spoke having a head and an elongated section with a pointed end into a spoke hole in a flange of a hub from a spoke ejection device arranged to face the spoke hole; comprising:
    receiving and holding the spoke in a spoke holding chamber arranged so that an exit therefrom faces the spoke hole;
    ejecting the pointed end of said spoke, into the spoke hole of the hub flange from the nozzle by air under pressure blown out from a substantially sealed spoke holding chamber.

2. The method as claimed in claim 1 including passing the head part of the spoke through a first portion of a groove having a bottom plane sloped down from one side wall to another side wall;
    a second portion of said groove extending from said bottom plane to two vertical side walls; and
    a third portion of said groove having a T shape.

3. An apparatus for inserting a spoke having a head and an elongated section with a pointed end into a spoke hole in a flange of a hub from a spoke ejection device; comprising,
    a nozzle for ejecting the spoke;
    a holder providing a groove for receiving the spoke;
    a groove cover for opening and shutting the groove;
    a groove cover driving device for opening the groove cover when the spoke is being received and shutting the cover when the spoke is to be ejected;
    an air outlet for blowing air under pressure into an end of said groove holding the head of said spoke; and
    an air pressure control device for blowing air under pressure from said air outlet into said groove when the groove cover is shut.

4. The apparatus as in claim 3 including a chamber forming a portion of the groove for receiving the spoke from the spoke supplying device, said groove comprising,
    a first groove part for receiving a head part of the spoke dropped from the spoke supplying device and having a bottom plane sloped down from one side wall to another side wall and extending from the head end of said spoke in said first groove part toward the pointed end of the spoke;
    a second groove part for guiding the head part of the spoke and having two walls shifted from an almost horizontal plane in the head end of the spoke in said second groove part to a vertical surface in the point end of the spoke; and
    a third groove part for guiding the spoke in a predetermined position and having a T shape section containing a head part course guiding the head part.

5. An apparatus for inserting a spoke into a spoke hole in a flange of a hub from a spoke ejection device; comprising,
    a spoke supplying device,
    a body for supplying air under pressure,
    a base,
    a nozzle to face the spoke hole of the hub flange;
    an intermittently revolving cylindrical body arranged at an injection side of the nozzle and having spoke holding holes therethrough at regular intervals along a concentric circle with the revolving cylindrical body's axis as a center;
    a spoke receiving groove for receiving the spoke dropped from the spoke supplying device and means to shift a spoke into the spoke holding hole at the highest position of the revolving cylindrical body;
    an air outlet formed in said body arranged at an injection end of the revolving cylindrical body for blowing air under pressure into the spoke holding hole rotated to the lowest position of the revolving cylindrical body.

6. The apparatus as in claim 5 including a chamber forming a portion of the groove for receiving the spoke from the spoke supplying device, said groove comprising, a first groove part for receiving a head part of the spoke dropped from the spoke supplying device and having a bottom plane sloped down from one side wall to another side wall and extending from the head end of said spoke in said first groove part toward the pointed end of the spoke;

a second groove part for guiding the head part of the spoke and having two walls shifted from an almost horizontal plane in the head end of the spoke in said second groove part to a vertical surface in the point end of the spoke; and a third groove part for guiding the spoke in a predetermined position and having a T shape section containing a head part course guiding the head part.

7. An apparatus for inserting a spoke into a spoke hole in a flange of a hub from a spoke ejection device; comprising:

a base;

a nozzle to face a spoke hole for ejecting the spoke into the spoke hole of the hub flange;

an intermittently revolving cylindrical body in contact with an injection end of the nozzle having grooves formed at regular intervals on the surface of the revolving cylindrical body;

each groove being open at both ends for receiving the spoke and holding the spoke in a predetermined position for being ejected into the spoke hole;

a cylindrical cover having an opening part in its top part for sealing grooves of the revolving cylindrical body;

said opening part of the cylindrical cover aligned with a position of the groove rotated at the highest position of the revolving cylindrical body and the spoke feeding part of the spoke supplying device;

an air outlet formed in an air container arranged at an injection end of the revolving cylindrical body for blowing air under pressure into the groove rotated to the lowest portion of the revolving cylindrical body.

8. The apparatus as in claim 7 including a chamber forming a portion of the groove for receiving the spoke from the spoke supplying device, said groove comprising, a first groove part for receiving a head part of the spoke dropped from the spoke supplying device and having a bottom plane sloped down from one side wall to another side wall and extending from the head end of said spoke in said first groove part toward the pointed end of the spoke;

a second groove part for guiding the head part of the spoke and having two walls shifted from an almost horizontal plane in the head end of the spoke in said second groove part to a vertical surface in the point end of the spoke side; and a third groove part for guiding the spoke in a predetermined position and having a T shape section containing a head part course guiding the head part.

* * * * *